(12) United States Patent
Lee (10) Patent No.: US 6,345,276 B1
(45) Date of Patent: Feb. 5, 2002

(54) REPRESENTING BASE POINTERS IN A SHARED MEMORY HEAP

(75) Inventor: Henry Lee, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,207

(22) Filed: Sep. 18, 1998

(51) Int. Cl.$^7$ .......................... G06F 17/30; G06F 12/00; G06F 15/167
(52) U.S. Cl. .................. 707/100; 707/101; 707/102; 711/100; 709/214; 709/215
(58) Field of Search ............................... 707/100, 101, 707/102, 103, 104, 206; 709/214, 215; 711/100

(56) References Cited

U.S. PATENT DOCUMENTS

| | | | | |
|---|---|---|---|---|
| 5,398,334 A | * | 3/1995 | Topka et al. ................. | 707/206 |
| 5,794,256 A | * | 8/1998 | Bennett et al. .............. | 707/206 |
| 5,999,987 A | * | 12/1999 | O'Farret et al. ............. | 709/304 |
| 6,031,995 A | * | 2/2000 | George ........................ | 717/10 |
| 6,105,041 A | * | 8/2000 | Bennett et al. .............. | 707/206 |

OTHER PUBLICATIONS

Kemper et al., Adaptable Pointer Swizzling Strategies in Object Bases, IEEE Data Engineering, 1993. Proceedings. Ninth International Conference, pp. 155–162, Apr. 1993.*
Alger, How to Stop Worrying and Start Loving C++. II, IEEE vol. 27, Issue 7, pp. 104–106, Jul. 1994.*
McAuliffe et al., A Trace–Based Simulation of Pointer Swizzling Techniques, IEEE Data Engineering, 1995. Proceedings of the Eleventh International Conference, pp. 52–61, Apr. 1993.*

* cited by examiner

Primary Examiner—Frantz Coby
(74) Attorney, Agent, or Firm—Klarquist Sparkman, LLP (57) ABSTRACT

A smart pointer contains two based addresses which are offsets relative to the start of a shared memory heap. One of the based addresses, a destination-pointer, is the offset of a data structure in the heap pointed to by the smart pointer. The other based address, a this-pointer, is the offset of the smart pointer itself. The smart pointer has a self-referencing property which returns an absolute address of the smart pointer within the address space of a process that has opened the heap in shared memory. The absolute address of the data structure pointed to by the smart pointer is calculated by subtracting the this-pointer from the absolute address of the smart pointer and then adding the destination-pointer.

23 Claims, 5 Drawing Sheets

REPRESENTING BASE POINTERS IN A SHARED MEMORY HEAP

FIELD OF THE INVENTION

This invention relates generally to computer shared memory systems, and more particularly to representing pointers to objects stored in shared memory.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ©1997, Microsoft Corporation, All Rights Reserved.

BACKGROUND OF THE INVENTION

Multiprocessing computer systems require that more than one process can open a data file at a time. On a shared memory system, the status information, or state, for an open file is usually stored in the shared memory so that a single copy of the state information can be accessed by all the processes that have the file open. The memory area containing the state information is often referred to as a "heap." Each item of state information is stored in a data structure in the heap and thus can be referenced using a pointer which contains the address of the structure within the heap. Therefore, when two processes need to communicate with one another regarding the state of a commonly open file, instead of incurring the overhead associated with passing the entire data structure in a buffer, they merely pass the pointer to the structure in the heap. Using pointers instead of buffers results in major performance gains.

Other types of data structures which can be referenced by more than one process are also stored in a shared memory heap and the pointers to those structures are similarly passed when inter-process communication is necessary. In an object-based computer system, the data structures stored in the heap are objects of various classes which contain information that must be communicated between two or more processes.

Each process in a shared memory system executes within its own virtual address space which is mapped into the physical memory. The address of the heap is defined within the virtual address space for each process. However, the addresses for the heap, and those of the items or objects in the heap, are different for each process. Using a pointer containing an address that is valid in the address space of in one process as the pointer means that the second process will view the address in the pointer as erroneous or will retrieve the wrong information.

One solution is to use relative pointers to reference objects in the file for inter-process communications. A relative pointer contains an address, or offset, that is relative to the start, or base address, of the heap. To access the information, a process adds the offset to the base address it has for the heap.

Using relative pointers presents its own problems. Each process must store its base address for the heap in memory, usually in a global variable so that all threads of the process have access to the base address. However, if a process must address more than one heap (because, for example, it has more than one file open), it must maintain a like number of global variables, and reinitialize the current base address when switching between the heaps. Alternatively, if each heap is associated with only one thread, the responsible thread can store the virtual address of the heap in thread local storage but this solution requires swapping thread contexts when switching between heaps, an expensive operation.

Therefore, there is a need in the art for a way to represent pointers to objects in shared memory heaps that leverages the performance gains achievable through the use of pointers but without the overhead currently associated with relative pointers. Such a pointer representation should also be capable of being transparently implemented in current programming environments.

SUMMARY OF THE INVENTION

The above-mentioned shortcomings, disadvantages and problems are addressed by the present invention, which will be understood by reading and studying the following specification.

A smart pointer contains two based addresses which are offsets relative to the start of a shared memory heap. One of the based addresses, a destination-pointer, is the offset of a data structure in the heap pointed to by the smart pointer. The other based address, a this-pointer, is the offset of the smart pointer itself. The smart pointer has a self-referencing property which returns an absolute address of the smart pointer within the address space of a process that has opened the heap in shared memory. The absolute address of the data structure pointed to by the smart pointer is calculated by subtracting the this-pointer from the absolute address of the smart pointer and then adding the destination-pointer. When more than one process has the same heap open in shared memory, the smart pointer is used to marshal a data structure between the processes.

The self-referencing property and the conversion method associated with the smart pointer guarantees that the data structure pointed to by the smart pointer will always be addressed correctly by any process that references the smart pointer. Standard pointer operations can be carried out efficiently by comparing the offset values in the destination-pointers instead of converting to the corresponding absolute addresses. A NULL pointer is also efficiently represented by setting the destination-pointer to zero.

Because the smart pointer of the present invention carries its own offset from the start of the shared memory heap, a process does not need to save the base address of the heap in its address space. Furthermore, the simplicity of the calculations required to resolve the relative address of the destination-pointer into an absolute address within a process's address space means that the additional processing cost of using smart pointers is minimal. Therefore, the smart pointer provides an efficient solution to the problems of representing pointers in a multiprocessing environment without the performance degradation associated with previous relative address pointers.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular Native Structured Storage implementation of the invention is described. Finally, in the fifth section, a conclusion of the detailed description is provided.

Hardware and Operating Environment

Figure 1:
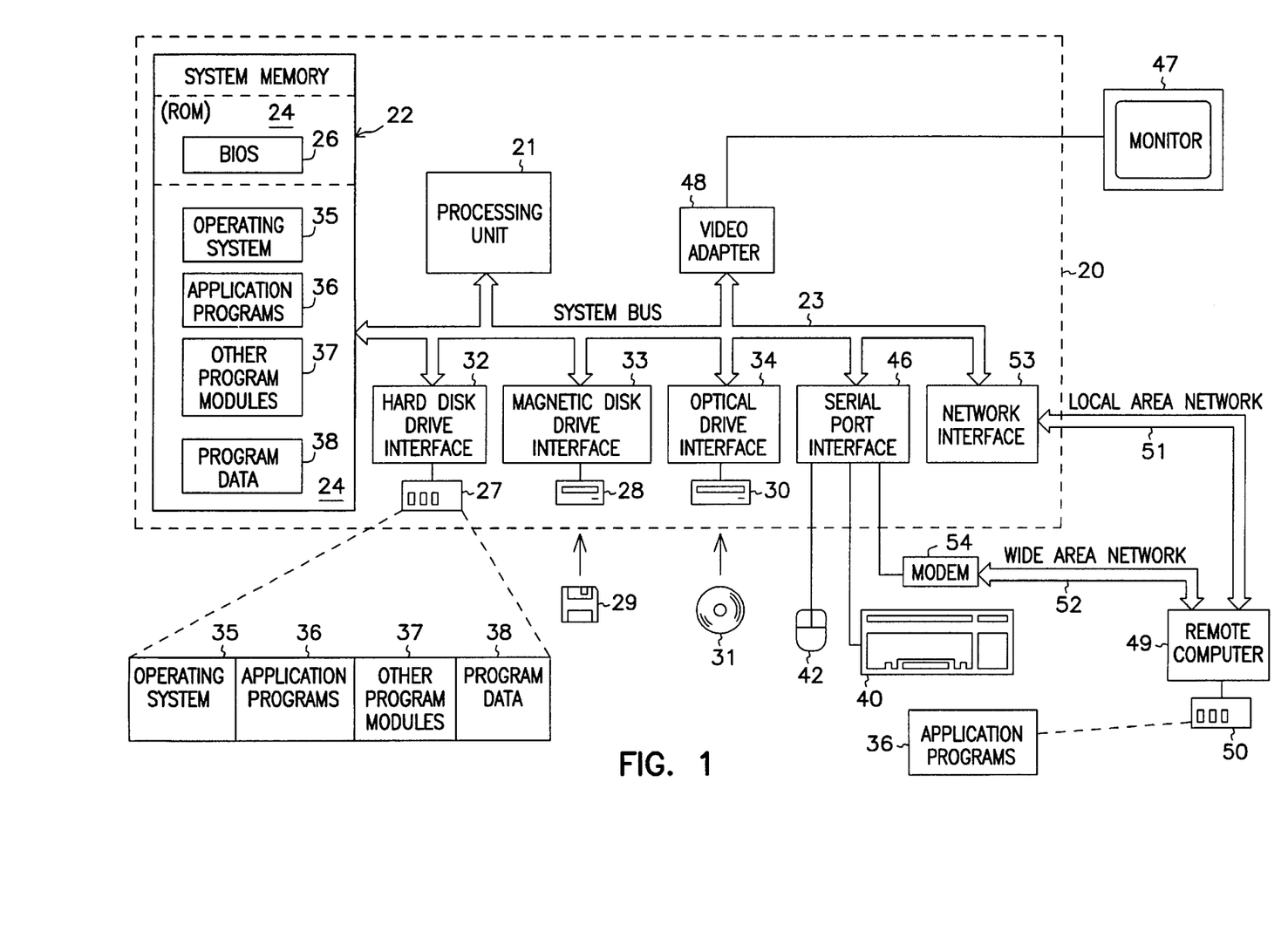
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2. The concepts of the invention are described as operating in a multiprocessing virtual memory operating environment on a computer, such as computer 20 in FIG. 1, which contains physical memory that is shared among the multiple processes executing on the computer. The exemplary operating environment comprises an object-based file system.

When a file, such as FileA, is first opened by a process (process 1), the file system allocates a heap 201 in shared memory 200 to hold objects (data structures) that define the state of the file. The heap 201 is mapped into a portion of process1's virtual memory address space at 10000–11000. When the process1 opens a second file, FileB, a second heap 211 is created and mapped to a different location in the process1's address space, e.g., 30000–32000.

When another process, process2, also opens FileA, the file system recognizes that FileA is already open and maps the existing heap 201 for FileA into the virtual memory address space for the process2 at 5000–6000. Similarly, when process3 opens FileB, the file system maps the heap 211 into process3's virtual memory address space at 1000–3000.

Each process references the state objects for FileA in terms of an absolute address in the process's address space. Thus, object0 203 is referenced using address 10020 by process1 and using address 5020 by process2, and object1 207 is referenced using address 10300 by process1 and using address 5300 by process2. When the shared memory objects are arranged in a hierarchical fashion in the file, a parent object contains pointer(s) to its children object(s): object0 203 contains an offspring pointer 204 to object1 207 as shown in FIG. 2.

Figure 2:
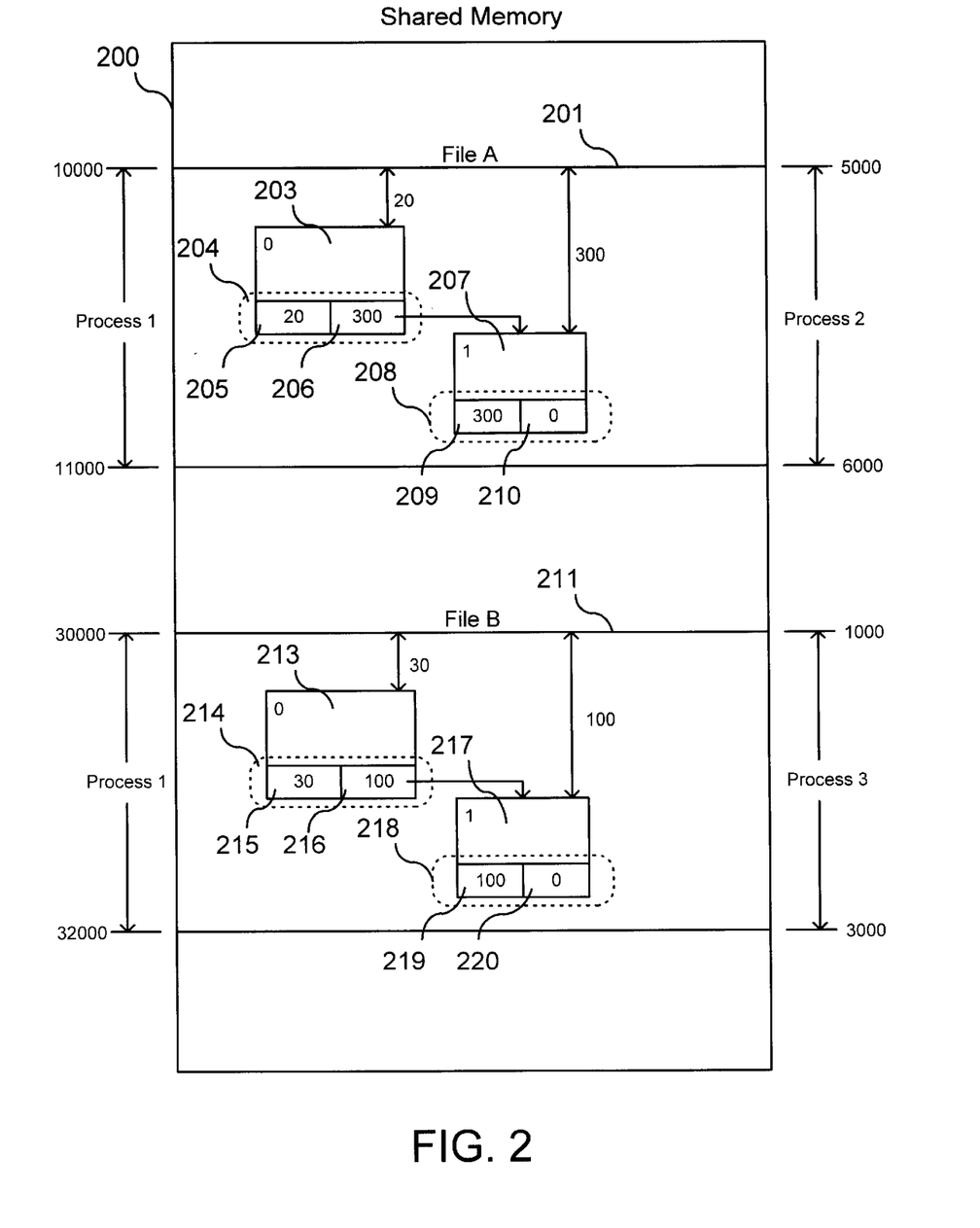
FIG. 2 is a diagram illustrating a system-level overview of an exemplary embodiment of a smart pointer of the present invention.

As further shown in FIG. 2, the offspring pointer 204 is a data structure comprising two fields 205, 206. The field 205 ("this-pointer") contains the relative offset of the offspring pointer 204 from the start of the heap 201 and the field 206 ("destination-pointer") contains the relative offset, 300, of the object1 207 from the start of the heap 201. In this example, the relative offset of the data structure which contains an offspring pointer is used as the relative offset of the offspring pointer to simplify the explanation. Thus, this-pointer 205 contains the value 20.

The combination of the destination-pointer and the this-pointer is referred to as a "smart" pointer. To a user process, a smart pointer behaves just like a normal pointer so that all standard pointer operations are available in programming the user process. When necessary to perform a pointer operation, the operating environment resolves the relative address of the data structure stored in the destination-pointer into the absolute address of a process.

The operating environment uses a standard pointer "self-referencing" property to obtain the absolute address of the smart pointer in the current address space. The offset value in the this-pointer is subtracted from the absolute address of the smart pointer to yield the absolute address of the start of the heap in the current address space. The offset value in the destination-pointer is added to the absolute add absolute address of the data structure pointed to by the smart pointer. Referring again to FIG. 2, the calculation for the absolute address of object1 207 in process1's address space is 10020−20=10000+300=10300. Similarly, the calculation for the absolute address of object1 207 in process2's address space is 5020−20=5000+300=5300.

Because the calculation recited above yields the absolute base address for the heap in the current address space if the destination-pointer is set to zero but no object is stored at the very beginning of the heap, a zero is stored in the destination-pointer to indicate that the pointer is empty, i.e., zero represents a null value. When the operating environment recognizes that the destination-pointer is zero, it returns NULL as the result of the pointer operation.

In performing comparison operations on smart pointers, the operating environment merely compares the offset values in the smart pointers to determine equality or inequality. The operating environment also converts between an absolute address in one address space to the corresponding absolute address in another address space when one process passes a smart pointer to a different process ("marshalling").

The methods used by the operating environment when working with smart pointers are described in detail in the next section.

In comparison with standard pointers, smart pointers have major advantages. If the value of a standard pointer is an absolute address within the address space of one process, then any other process attempting to use the pointer will, at best, fail because the value is invalid in its address space or, at worse, retrieve erroneous information. Alternatively, if the value for a regular pointer is a relative address, then the process itself must store the base address somewhere, such as in a global variable or in thread local storage for the process.

Neither solution is satisfactory for a process that works with multiple heaps such as when multiple files are open simultaneously. When multiple heaps are open, the process must manage a like number of global variables with a corresponding increase in process overhead. Using thread local storage requires swapping contexts when a change in base addresses is needed, an operation that is very costly in terms of performance.

Because the smart pointer of the present invention contains its own offset from the base address of the heap, as well as the offset of the data structure pointed to, it avoids the limitations of a using standard pointer without incurring high overhead costs. Furthermore, the simplicity of the calculations required to resolve the relative address of the destination-pointer into an absolute address within a process's address space means that the additional processing cost of using smart pointers is minimal. Using the relative value stored in the destination-pointer instead of calculating the absolute address when performing various pointer operations reduces the already minimal processing cost of smart pointers. Therefore, the smart pointer provides an efficient solution to the problems of representing pointers in a multiprocessing environment.

The system level overview of the operation of an exemplary embodiment of the invention has been described in this section of the detailed description. A smart pointer that contains relative addresses for itself and for the information it points to has been described. While the invention is not limited to use with any particular file structure or file system, for sake of clarity a simplified object-based file system which uses interrelated objects to store a file's state has been described. One of skill in the art will further recognize the advantages of the invention when practiced in conjunction with other hierarchical data structures which can be stored in shared memory heaps, such as those employed to hold state information about files, objects and transactions.

Methods of an Exemplary Embodiment of the Invention

In the previous section, a system level overview of the operation of an exemplary embodiment of the invention was described. In this section, the particular methods performed by a operating environment executing an exemplary embodiment are described by reference to a series of flowcharts shown in FIGS. 3A–7. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3A–7 are inclusive of the acts required to be taken by an operating environment executing an exemplary embodiment of the invention.

As described in the previous section, the operating environment converts the relative address of the destination-pointer into an absolute address for an object stored in a shared memory heap using the this-pointer to calculate the absolute address for the base address of the heap. The method employed is illustrated in FIG. 3B and explained in more detail below.

Figure 3A:
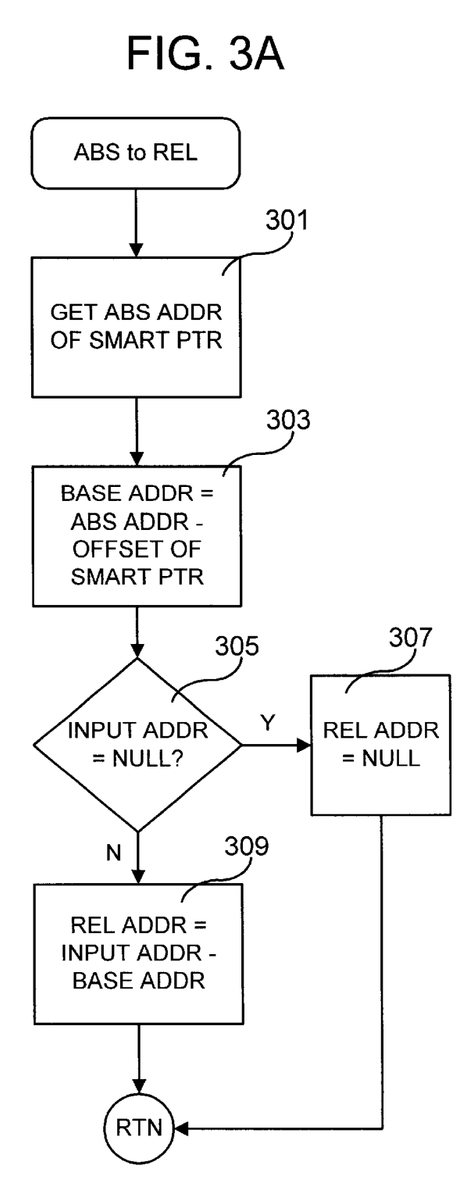
FIGS. 3A and 3B are flowcharts of methods to be performed when converting between absolute and relative addresses according to an exemplary embodiment of the invention.

The operating environment also must convert an absolute address in an address space into a relative address as shown in FIG. 3A. The operating environment obtains the absolute address of a smart pointer in the address space using the self-referencing capabilities of the pointer (block 301). The base address of the start of the heap in the current address space is calculated by subtracting the offset value stored in the this-pointer of the smart pointer of the object from the absolute address of the smart pointer (block 303). If the absolute address of the smart pointer (the input address to be converted) is equal to a pre-determined NULL value, such as the beginning of the heap (block 305), the relative address is set to zero to indicate a NULL address (block 307). Otherwise, the relative address is calculated by subtracting the base address from the input absolute address (block 309).

Figure 3B:
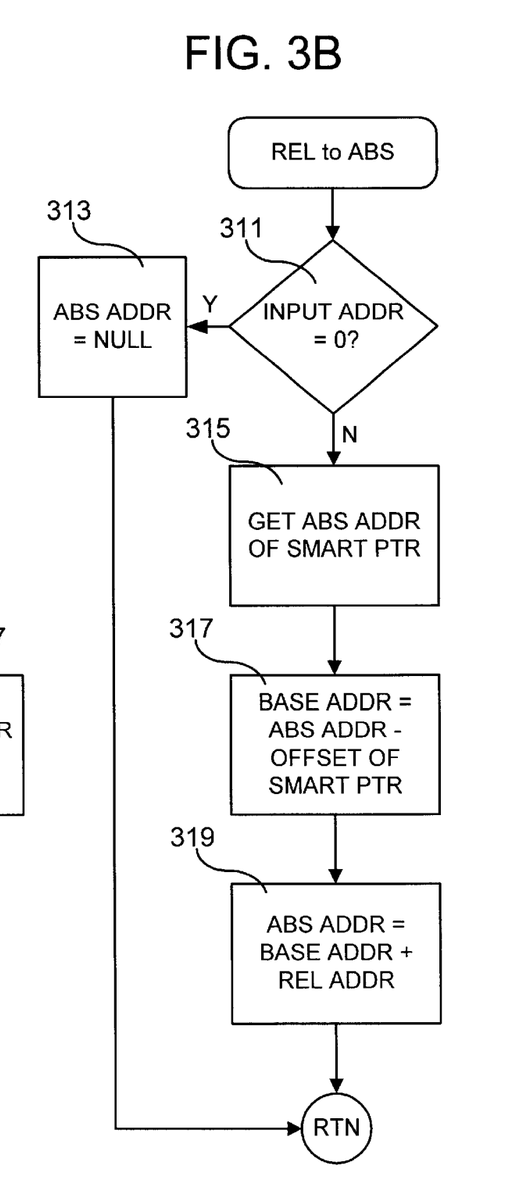

Turning now to FIG. 3B, the relative address input into the conversion is checked to see if it is zero (block 311). If so, the absolute address is set to NULL (block 313). Otherwise, the absolute address of a smart pointer in the address space is obtained (block 315). The base address of the start of the heap is calculated by subtracting the offset value stored in the this-pointer from the absolute address of the smart pointer (block 317). The corresponding absolute address is the base address plus the offset value stored in the destination-pointer of the smart offspring pointer in the parent object (block 319).

Figure 4A:
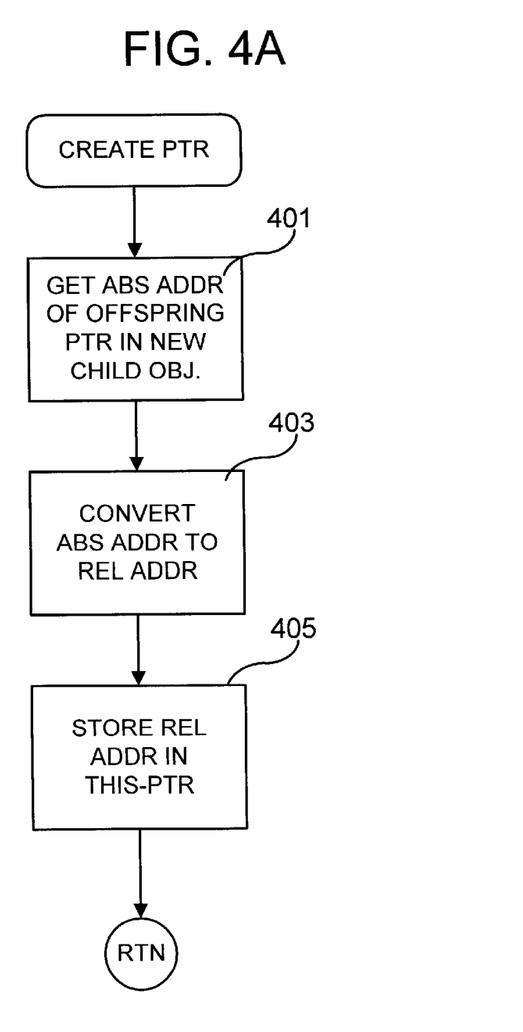
FIGS. 4A and 4B are flowcharts of methods to be performed when storing information in a file according to an exemplary embodiment of the invention.
Figure 4B:
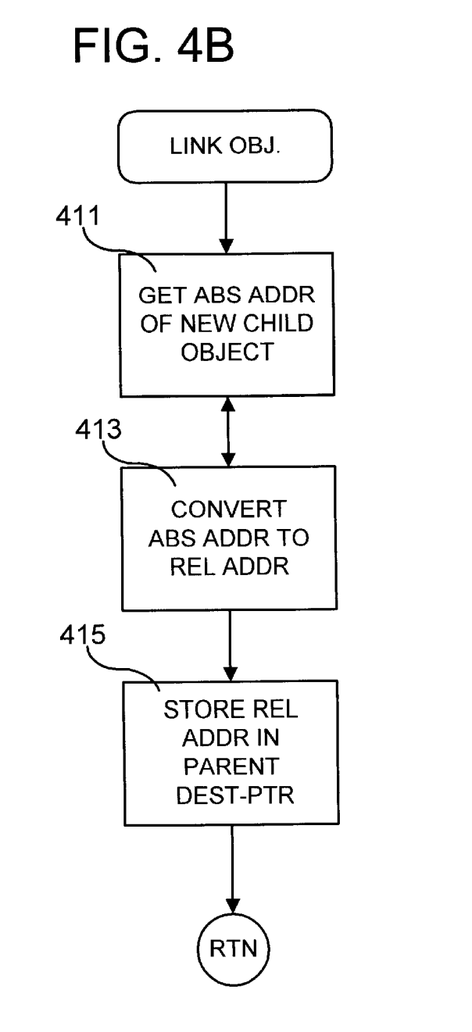

FIGS. 4A and 4B illustrate the methods to be performed when adding a new object to a heap. When the new object is created by a process, a smart offspring pointer is initialized in the new object as shown in FIG. 4A. The absolute address of the smart offspring pointer in the address space of the creating process is obtained (block 401) and input into the method shown in FIG. 3A to be converted from its absolute address to the corresponding relative address (block 403). The resulting relative address of the smart offspring pointer for the new object within the heap is stored in the this-pointer of the new object (block 405).

A newly created child object is linked to its parent object as shown in FIG. 4B. The absolute address of the child object is obtained (block 411) and input into the conversion method shown in FIG. 3A (block 413). The resulting relative address for the child object within the heap is stored in the destination-pointer of the parent object (block 415).

The methods performed when various standard pointer operations are invoked using smart pointers are described next. Note that in all pointer operations, the self-referencing property of pointers provided by the operating environment means that the smart pointer itself will be correctly addressed in the address space of the process that invokes the operation.

Figure 5:
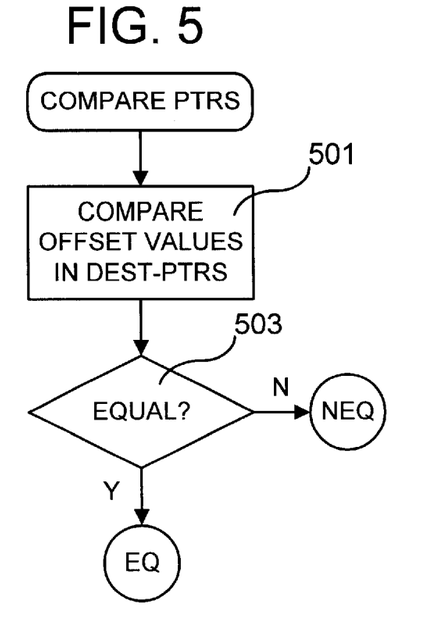
FIGS. 5, 6, and 7 are flowcharts of methods to be performed when the smart pointer of the present invention is referenced by standard pointer operations.

FIG. 5 illustrates the method to be performed when comparing smart pointers. The offset values of both destination-pointers are compared (block 501) and a value representing EQUALITY or INEQUALITY (block 503) is returned based on the comparison.

Figure 6:
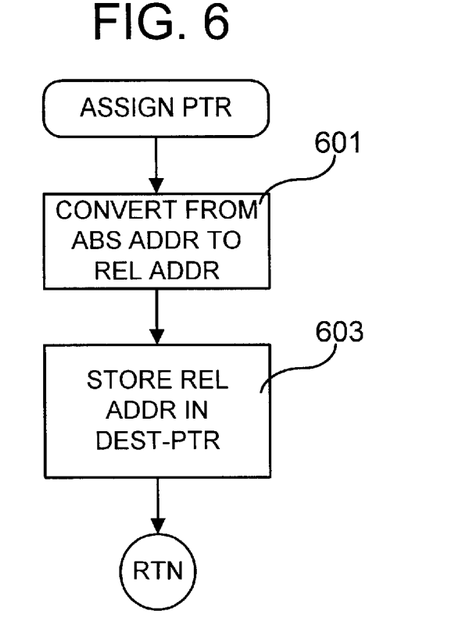

FIG. 6 illustrates the method to be performed when assigning an absolute address for an object to a smart pointer (target). The absolute address is converted into a relative address (block 601) using the method shown in FIG. 3A in which the target smart pointer itself is used to determine the base address for the conversion. The resulting relative address for the object is stored in the destination-pointer of the target smart pointer (block 603).

Figure 7:
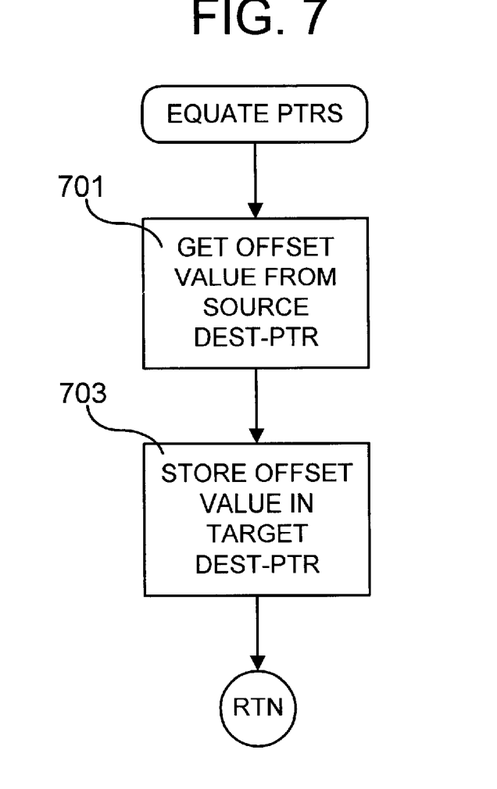

FIG. 7 illustrates the method to be performed when equating one smart pointer (target) to another (source). The offset value of the destination-pointer is obtained from the source smart pointer (block 701) and stored in the destination-pointer of the target smart pointer (block 703).

Marshalling an object between processes using a smart pointer merely requires converting the relative address in the destination-pointer to the corresponding absolute address in the address space of the receiving process using the method shown in FIG. 3B.

The particular methods performed by an operating environment to support an exemplary embodiment of the smart pointers of the invention have been described. The methods have been shown by reference to a series of flowcharts including all the steps from 301 until 319, from 401 until 415, from 501 until 503, from 601 until 603, and from 701 until 703. The methods provide highly efficient code for pointer operations and marshalling when using smart pointers instead of standard pointers.

Native Structured Storage Implementation

In this section of the detailed description, a particular implementation of the invention is described that is implemented in Microsoft Windows NT in conjunction with Native Structured Storage (NSS). Most file systems have traditionally been built around a directory-file hierarchy. A directory was viewed as a collection of files and the files themselves were viewed as a single stream of data bytes.

With the advent of Microsoft's Component Object Model (COM), an object representing a spreadsheet could be embedded (or linked) in another object representing a word processing document so both objects had to be stored in a file that could be referenced by the word processing application. NSS accomplishes this by serializing the objects into a single file format, i.e., all objects included in a file are stored one after another in the file, and interrelating the object through pointers.

An NSS file is a collection of storage objects and stream objects that form a "compound" file. A storage object can contain other storage objects and stream objects and acts like a traditional directory. A stream object contains data stored as a single stream of data bytes and acts like a traditional file.

Each compound file contains a root storage object that tracks the state of the file. A stream object that holds the native data of the file, such as text for a document, is linked to the root storage object in a parent-child relationship using a smart pointer of the present invention. The root object also can be the parent object for any number of storage objects. The storage objects contain stream objects representing the embedded or linked objects; a storage object can contain other storage objects. Each storage object is linked through smart offspring pointers to its child storage objects and child stream objects. Thus, a compound file can contain multiple levels of nested objects which are interrelated through smart pointers.

The NSS smart offspring pointer class is implemented as a C++ template. The this-pointer and the destination-pointer are designated as four bytes each, making the smart offspring pointer in a parent object eight bytes in length. For example, template <class T> TBasedPointer
{
private:
unsigned int This;
unsigned int Offset;
} where "This" represents the this-pointer and "Offset" represents the destination-pointer.

The methods described in the previous section are implemented by overloading the standard C++ pointer operators so that the necessary methods are performed transparently to any process which utilizes them. Overloading is a well-known technique in which a single operator compiles into different code depending on the type of the object specified in the statement referencing the operator. The following examples illustrate the overloading of the corresponding standard C++ operators:

inline T* operator->() const //based pointer to pointer
{
   return (T*) BasedPointerToAbsolutePointer ();
}
inline T & operator* () const //based pointer to pointer
   return*(T*) BasedPointerToAbsolutePointer ();
inline operator T* () const //based pointer to pointer
{
   return (T*) BasedPointerToAbsolutePointer ();
}
inline T* operator=(T* pT) //pointer to based pointer
{
   $_{13}$ uOffset=AbsolutePointerToBasedPointer (pT);
return pT;
}

Using the smart pointers of the present invention as part of NSS improves the performance of COM over previous implementations which relied on global variables or local thread storage. The methods necessary to support the smart pointers are highly efficient and are implemented transparently in the C++ compiler.

Conclusion

A smart pointer for interrelating data structures in shared memory heap has been described. The smart pointer is a two-field data structure where one field contains a relative address for the smart pointer structure and the other field contains a relative address for the data structure pointed to by the smart pointer. Both addresses are based on the start address of the shared memory heap that contains the objects. A method of converting between the relative addresses of the smart pointer and the corresponding absolute addresses in the address space of a process has also been described. The conversion method is used in implementing various standard pointer operators which make the use of the smart pointers transparent to a user process or application programmer.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the smart pointer has been described in terms of C++ templates, C macros can easily be substituted. Furthermore, those of ordinary skill within the art will appreciate that the objects, and object-oriented file system and operating environment referred to herein are comparable with other types of data structures and their supporting file systems and operating environments.

The terminology used in this application with respect to is meant to include all of these environments. Therefore, it is manifestly intended that this invention be limited only by the following claims and equivalents thereof.

We claim:

1. A computerized system comprising:
   a computer comprising a processor, a shared memory, and a computer-readable medium;
   an operating environment executing in the processor from the computer-readable medium;
   a plurality of processes executing in the processor from the computer-readable medium and under the control of the operating environment; and a plurality of data structures written into the shared memory from the computer-readable medium by the operating environment in response to a request from one of the plurality of processes, each data structure comprising a smart pointer to relate the data structure to another of the plurality of data structures, each smart pointer comprising a relative address in the shared memory for the smart pointer and a relative address for a data structure pointed to by the smart pointer, wherein the relative address for the smart pointer represents a difference between an absolute address of a base location of the shared memory and an absolute address of the smart pointer, and the relative address for the data structure pointed to by the smart pointer represents a difference between an absolute address of a base location of the shared memory and an absolute address of the data structure pointed to by the smart pointer; and wherein the operating environment converts between the relative address for the data structure in one of the plurality of smart pointers and a corresponding absolute address for the data structure within the address space of a process accessing the data structure.

2. The computerized system of claim 1, wherein the operating environment is a C++ program environment and the plurality of smart pointers are specified within the operating environment as a template.

3. The computerized system of claim 2, wherein the conversion performed by the operating environment is implemented by overloading pointer operations.

4. The computerized system of claim 1, wherein the operating environment is a C program environment and the plurality of smart pointers are specified within the operating environment as a macro.

5. The computerized system of claim 1, wherein the plurality of data structures are objects related to a file arranged in a hierarchy.

6. The computerized system of claim 5, wherein the object at the top of the hierarchy is a root storage object that contains a state for the file.

7. The computerized system of claim 5, wherein at least two of the plurality of processes have opened the same file and communicate by passing a smart pointer to an object.

8. A computerized method for addressing a data structure in a shared memory heap comprising:
   obtaining an absolute address for a smart pointer to the data structure, wherein the smart pointer comprises a relative address for the smart pointer and a relative address for the data structure;
   calculating an absolute base address for the shared memory heap by subtracting the relative address for the smart pointer from the absolute address for the smart pointer; and
   calculating an absolute address for the data structure by adding the relative address for the data structure to the absolute base address.

9. A computer-readable medium having computer-executable instructions to cause a computer to perform the method of claim 8.

10. The computer-readable medium of claim 9, wherein the computer-executable instructions cause the computer to overload pointer operations to perform the method.

11. The computerized method of claim 8, wherein zero is used to represent a null relative address.

12. A computerized method for linking data structures in a shared memory heap comprising:
   obtaining an absolute address in the heap for a smart offspring pointer in an child data structure;
   converting the absolute address for the smart offspring pointer in the child data structure to a relative address based on the start of the heap;
   storing the relative address for the smart offspring pointer in a first portion of the smart offspring pointer in the child data structure;
   obtaining an absolute address in the heap for the child data structure;
   converting the absolute address for the child data structure to a relative address based on the start of the heap; and
   storing the relative address for the child data structure in a second portion of a smart offspring pointer in a parent data structure to link the child data structure to the parent data structure.

13. The computerized method of claim 12, wherein the acts are performed in the order recited.

14. The computerized method of claim 12, wherein converting the absolute address for the smart offspring pointer in the child data structure to a relative address comprises:
   calculating the absolute base address for the start of the heap by subtracting a relative address stored in a first portion of the smart offspring pointer in the parent data structure from the absolute address of the smart offspring pointer in the parent data structure; and
   calculating the relative address for the smart offspring pointer in the child data structure by subtracting the absolute base address from the absolute address for the smart offspring pointer in the child data structure.

15. The computerized method of claim 12, wherein converting the absolute address for the child data structure to a relative address comprises:
   calculating the absolute base address for the start of the heap by subtracting the relative address stored in the first portion of the smart offspring pointer in the child data structure from the absolute address of the smart offspring pointer in the child data structure; and
   calculating the relative address for the child data structure by subtracting the absolute base address from the absolute address for the smart offspring pointer in the child data structure.

16. A computer readable medium having a file system stored thereon, the file system comprising:
   a plurality of file objects in a compound file;
   a plurality of state objects stored in a shared memory heap linked in a hierarchy, each state object representing a state of a corresponding file object; and;
   a plurality of smart pointers stored in the state objects to link the state objects in the hierarchy, each smart pointer comprising a relative address for the smart pointer and a relative address for an object lower in the hierarchy, wherein the relative address for the smart pointer represents a difference between an absolute address of a base location of the shared memory heap and an absolute address of the smart pointer, and the relative address for the object lower in the hierarchy represents a difference between an absolute address of a base location of the shared memory heap and an absolute address of the object lower in the hierarchy.

17. The computer readable medium of claim 16, wherein zero is stored as the relative address of the lower object when no lower object exists in the hierarchy.

18. A computer readable medium having a file system stored thereon, the file system comprising:
   a plurality of file objects in a compound file;
   a plurality of state objects stored in a shared memory heap linked in a hierarchy, each state object representing a state of a corresponding file object; and a plurality of smart pointers stored in the state objects to link the state objects in the hierarchy, each smart pointer comprising a relative address for the smart pointer and a relative address for an object lower in the hierarchy, wherein the relative addresses are relative to a base location of the shared memory heap, and wherein the relative address for an object lower in the hierarchy in a smart pointer is converted into an absolute address in a process address space by calculating an absolute base address for the base location of the shared memory heap and adding the relative address to the absolute base address.

19. The computer readable medium of claim 18, wherein the absolute base address is calculated by subtracting the relative address for the smart pointer from an absolute address for the smart pointer.

20. A computer-readable medium having stored thereon a smart pointer data structure comprising:

a first field containing data representing an address for the smart pointer data structure relative to a base address, wherein the relative address for the smart pointer data structure represents a difference between the base address and an absolute address of the smart pointer data structure; and a second field containing data representing an address for an object pointed to by the smart pointer data structure identified by the first field, wherein the address of the object is relative to the base address and represents a difference between the base address and an absolute address of the object.

21. The computer-readable medium of claim 20, wherein a null pointer is represented by a zero in the second field.

22. A computer readable medium having a file system stored thereon, the file system comprising:

a plurality of file objects in a compound file;

a plurality of state objects stored in a shared memory heap, each state object representing a state of a corresponding file object; and a plurality of self referencing smart pointers stored in the state objects to link the state objects, each smart pointer comprising a relative address for an object, wherein the relative addresses represent a difference between an absolute address of a base location of the shared memory heap and an absolute address of the respective objects.

23. A computerized system comprising:

a computer comprising a processor, a shared memory, and a computer-readable medium;

an operating environment executing in the processor from the computer-readable medium;

a plurality of processes executing in the processor from the computer-readable medium and under the control of the operating environment; and a plurality of data structures written into the shared memory from the computer-readable medium by the operating environment in response to a request from one of the plurality of processes, each data structure comprising a smart pointer operable to relate the data structure to another of the plurality of data structures, each smart pointer comprising at least a relative address in the shared memory for the smart pointer itself, wherein the relative address for the smart pointer itself represents a difference between an absolute address of a base location of the shared memory and an absolute address of the smart pointer itself.

* * * * *

UNITED STATES PATENT AND TRADEMARK OFFICE
CERTIFICATE OF CORRECTION

PATENT NO. : 6,345,276 B1
DATED : February 5, 2002
INVENTOR(S) : Lee

It is certified that error appears in the above-identified patent and that said Letters Patent is hereby corrected as shown below:

Column 1,
Line 54, "of in" should read -- of --.

Column 4,
Line 6, "include" should read -- including --.
Line 18, "a" should read -- A --.

Column 6,
Lines 31-23, "absolute add absolute address" should read -- absolute address of the start of the heap to yield the absolute address --.

Column 7,
Line 42, "a operating" should read -- an operating --.

Column 10,
Line 8, "return*(T*) BasedPointerToAbsolutePointer ();" should read
-- {
return*(T*) BasedPointerToAbsolutePointer ();
} --.
Line 15, "$_{13}$uOffset" should read -- _uOffset --.
Lines 55-56, "with respect to is meant" should read -- is meant --.

Column 11,
Line 67, "in an child" should read -- in a child --.

Signed and Sealed this

Nineteenth Day of November, 2002

Attest:

JAMES E. ROGAN
Attesting Officer
Director of the United States Patent and Trademark Office